Feb. 21, 1961     E. HARTER     2,972,288
LONGITUDINAL PROFILING ATTACHMENT
Filed Sept. 30, 1958
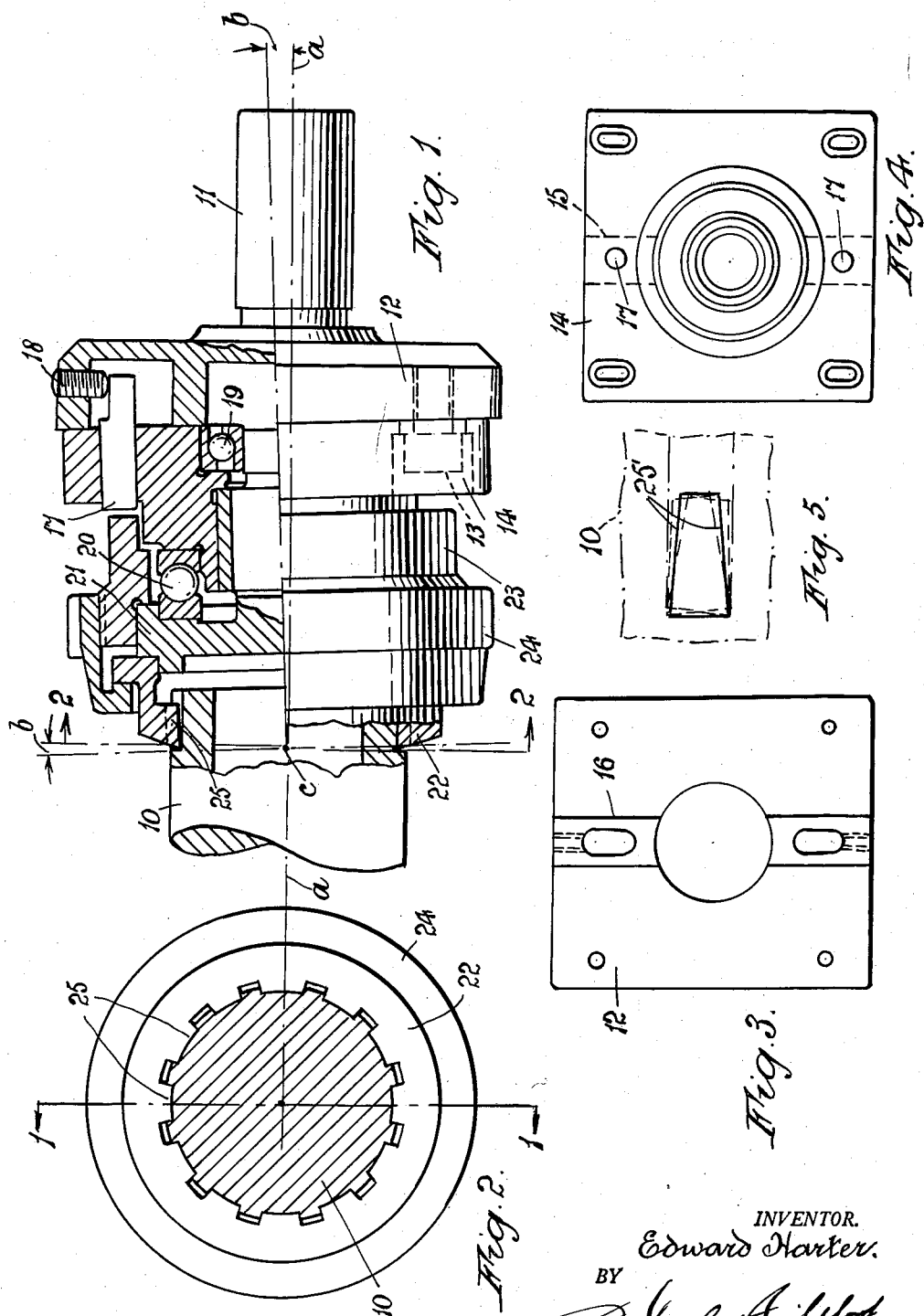
INVENTOR.
Edward Harter.
BY
Stanley Lightfoot.
Attorney.

United States Patent Office 2,972,288
Patented Feb. 21, 1961

2,972,288

LONGITUDINAL PROFILING ATTACHMENT

Edward Harter, Birmingham, Mich., assignor to The Wickman Products Corp., Oak Park, Mich., a corporation of Michigan Filed Sept. 30, 1958, Ser. No. 764,399

1 Claim. (Cl. 90—24)

This invention relates to the grooving or profiling of cylindrical work, such as the forming for instance, of keyways, splines or gear teeth, and has for its object to provide a simple means for effecting such profiling with a tool having a cutting tooth (or cutting teeth) rotating with the work as it is fed longitudinally thereof in such manner that the cutting tooth (or each individual tooth of a series) has the maximum feed thrust concentrated thereon at a predetermined point in its rotary path of operation.

In its simplest form my improved profiling device is characterized by the fact that the cutter, as it is fed forwardly, is rotated by the work during the profiling operation.

More particularly, however, the invention contemplates the mounting of the cutter on an axis slightly inclined to the axis of the work, and feeding of the cutter along the axis of the work whereby the plane of rotation of the face of the cutter is tilted at a fixed angle transversely of the work, thus causing the cutter tooth (or teeth) to concentrate cutting energy at a single point of rotation, as distinguished from the distribution of cutting energy throughout the rotary progress of the tooth or teeth as has been hitherto usual in profiling with cutters rotating about a common axis with that of the work.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a side elevation of the improved profiling attachment, with the upper portion of the figure shown in section taken on a plane indicated by the line 1—1 in Figure 2;

Figure 2 is a transverse section through the work taken on a plane indicated by the line 2—2 in Figure 1;

Figure 3 is a front end elevation of the fixed head member of the device;

Figure 4 is a front end elevation of the radially adjustable socket member of the device; and Figure 5 is a diagram illustrating relative positions of a cutting tooth to the groove of the work during operation of the tool.

Figures 3 and 4 are drawn to a somewhat smaller scale than are the other figures of the drawing.

Similar characters of reference indicate similar parts in all figures of the drawing.

The work, such as a cylindrical bar 10, is rotated on the center line $a$ which is also the center line of the shank 11 of a fixed head 12 carried by the turret or other supporting member (not shown) of a profiling machine with which the device is used. This head 12 is characterized by the fact that its face is not at right angles to the center line $a$, but is at a slight angle thereto as indicated at $b$ for reasons which will be explained.

Secured on this inclined face of fixed head 12 by bolts 13 is an adjustable socket member 14 having a groove 15 formed in its rear surface matching a tongue 16 formed on the face of the fixed head 12 to guide the said socket member in its adjustment at right angles to its axis of inclination. A pair of pins or abutments 17 project rearwardly of the socket member 14 into recesses provided in the fixed head 12, which head is also provided with adjusting screws 18 to impinge on these abutments 17, whereby the precise slidable adjustment of the socket member may be effected, after which the socket member may be firmly secured in such position of adjustment by tightening the bolts 13.

The socket member 14 is provided with radial thrust bearings 19 and 20 on which is mounted a freely rotatable cutter-supporting head 21 carrying the box-type cutter 22. The cutter-supporting head 21 is enclosed in a sleeve or housing 23 on which the retaining ring 24 is threaded to secure the cutter 22 to its supporting head 21.

The said cutter 22, in this example, is provided with an internal circular series of cutting teeth 25. There may, however, be only one cutting tooth where only a single groove is to be cut in the work. Where more than one cutting tooth is employed they may be spaced regularly, or irregularly, as may be desired and, furthermore, the teeth may vary from one another as to size and shape to meet corresponding variations of grooving to be effected on the work.

With the arrangement as shown in Figure 1, it is desirable that the tilting of the cutter be effected about the point $c$ on the center line $a$ as intersected by the plane of the face of the cutter.

Due to the angularity of the cutter to the axis of the work, the angle of the presentation of the cutting edge of any tooth to the work varies during each revolution of the cutter, as illustrated diagrammatically in Figure 6. Considered in the setting, as shown in Figures 1 and 2 of the drawings, wherein the uppermost tooth is advanced to the greatest extent beyond the lowermost tooth of the cutter, it will be noted that a tooth rotating in a counter-clockwise manner, as viewed in Figure 2, will at its lowermost point be directed parallel to its groove, but will assume an angular position (which is that of the angle to which the cutter is tilted) as shown in dotted lines in Figure 6 as it moves through 90° rotation; following which it will again become parallel with the groove as it reaches the uppermost point of rotation.

Conversely, as the tooth moves downwardly through a further 90° of rotation from such uppermost point it will again assume such angular relation to its groove. While no actual oscillation of the tooth takes place, this relative angular variation has the same effect as if the tooth were actually oscillating from one side to side of the groove; so that the flanks 25' of each tooth must be tapered, or relieved rearwardly, as shown in Figure 6 to permit of this angular change of disposition of the tooth between the walls of the groove.

Similarly the crest of each tooth is relieved to accommodate the angular variation of disposition of each tooth to the base of its groove during rotation as clearly shown in Figure 1, wherein the crest of the lower tooth is practically parallel to the base of its groove whereas the crest of the upper tooth is shown as at an angle to the base of its groove.

These relative changes of disposition of a tooth to the work results in a highly efficient cutting operation being effected, especially as the cutting effort is constantly transferred to the most advanced tooth, in this case the uppermost tooth, as it approaches such advanced position.

By means of the invention described, rapid and accurate external profiling of cylindrical work may be effected in high speed machines, such as automatic profiling machines, in a very simple manner which lends itself to adaptation to existing machines of that character, in many cases with no redesigning or alternation other than the application thereto of the angularly disposed support for the cutter.

This invention may be developed within the scope of the following claim without departing from the essential features of the said invention, and it is desired that the specification and drawing be read as being merely illustrative of a practical embodiment of the same and not in strictly limiting sense.

What I claim is:

In a profiling tool having reciprocal movement along a longitudinal path of travel for cutting an external keyway on a rotatable workpiece, a stationary cutter supporting head having a fixed longitudinal axis coinciding with that of the workpiece, and a cutter having at least one inwardly directed cutting tooth having a transverse cutting edge spaced from the longitudinal axis of said cutter supporting head, said cutter having a longitudinal axis of rotation inclined relative to the longitudinal axis of said cutter supporting head, said transverse cutting edge having an effective cutting portion progressively reoriented in response to relative rotation between said cutter supporting head and said cutter, said cutter being adjustable laterally on said head in a plane common to the axes of said cutter and of said work to vary the point of intersection of said axes.

References Cited in the file of this patent

UNITED STATES PATENTS

| | | |
|---|---|---|
| 1,123,045 | Warren | Dec. 29, 1914 |
| 2,035,434 | Loewus | Mar. 24, 1936 |
| 2,180,823 | Harrison | Nov. 21, 1939 |
| 2,230,455 | Githens | Feb. 4, 1941 |
| 2,452,095 | Berkman | Oct. 26, 1948 |
| 2,629,294 | Kopec | Feb. 24, 1953 |

FOREIGN PATENTS

| | | |
|---|---|---|
| 273,472 | Switzerland | May 1, 1951 |
| 881,674 | France | Feb. 4, 1943 |